United States Patent [19]

Broadbent et al.

[11] 3,713,981

[45] Jan. 30, 1973

[54] ENZYMES FROM ARMILLARIA MELLEA

[75] Inventors: Douglas Broadbent, Alderley Edge, Cheshire; Ralph William Turner, Cheadle, Cheshire; Peter Leslie Walton, Knutsford, Cheshire, all of England

[73] Assignee: Imperial Chemical Industries Limited, London, England

[22] Filed: Aug. 31, 1970

[21] Appl. No.: 68,501

[30] Foreign Application Priority Data

Sept. 26, 1969 Great Britain....................47,554/69
May 7, 1970 Great Britain....................22,129/70

[52] U.S. Cl....................195/62, 195/66 R, 424/94, 195/66 B

[51] Int. Cl. ........................C12d 13/10, A61k 19/00
[58] Field of Search................195/62, 65, 66 R, 66 B

[56] References Cited

UNITED STATES PATENTS 3,256,157   6/1966   Truant et al. ........................195/66 B Primary Examiner—Lionel M. Shapiro
Attorney—Cushman, Darby & Cushman

[57] ABSTRACT

An enzymic substance, AM protease, having fibrinogenolytic, fibrinolytic and anticoagulant activity. Processes for preparing AM protease. Pharmaceutical compositions containing AM protease.

4 Claims, No Drawings

ENZYMES FROM ARMILLARIA MELLEA

This invention relates to enzymes and more particularly it relates to an enzymic substance which has fibrinogenolytic and fibrinolytic activity. Also, the said enzymic substance causes anticoagulant effects. We believe it does this partly by virtue of its fibrinogenolytic activity (that is, the anticoagulant effects appear to result partly from the destruction of fibrinogen and the inhibitory effect of the fibrinogen breakdown-products upon the formation of fibrin from the remaining fibrinogen), and partly due to destruction of other coagulation factors susceptible to proteolytic attack, for example Factors V and VIII.

We have found that the mature fruiting body, or cap, of the fungus *Armillaria mellea* is a source of a useful enzymic substance which is the subject of this application. *Armillaria mellea* grows parasitically or saprophytically on trees, and it occurs throughout the United Kingdom and in other countries of the world. A brief description of the fungus is as follows:

Pileus 2–6 inches across, at first rounded, then flattened, and eventually depressed in the center. Color varies from yellowish to deep brown. Stem 3 to 6 inches long and up to one-half inch thick. Ring whitish. Gills whitish to flesh colored, adnate or slightly decurrent. Spores colorless under the microscope, 8–9 × 5–6$\mu$. The fruiting bodies are best harvested, so as to obtain the said enzymic substance, from about August to the first frosts. After harvesting, the fruiting bodies should be stored at about −25°C. or lower until the isolation procedure described below is carried out.

We have found that the said enzymic substance is not obtainable from all specimens of *Armillaria mellea*. Thus, we obtained the said enzymic substance from a little over one third (approximately 50 out of a total of approximately 140) of the samples of the fungus which we collected in the United Kingdom during 1969. The reasons why some samples did not afford the said enzymic substance are unknown to us. Samples of *Armillaria mellea* which are available to the public and which afford the said enzymic substance are:

1. the specimen identified as FPRL 6H by (and available to the public from) the Ministry of Technology, Forest Products Research Laboratories, Princes Risborough, Aylesbury, Buckinghamshire, England (our reference: ACC 3659); and
2. the specimen identified simply as "*Armillaria mellea*" by (and available to the public from) the Centraalbureau voor Schimmelcultures, Baarn, Netherlands (our reference: ACC 3253).

According to the invention there is provided the said enzymic substance which is a peptidyl-peptide-hydrolase (syn. peptide-peptido-hydrolase), and which we shall refer to as "AM protease" in this specification. AM protease has the following characteristic properties:

1. It catalyses the hydrolytic degradation of fibrinogen and fibrin (i.e. it exhibits fibrinogenolytic and fibrinolytic activity respectively). The activity of AM protease in vitro has been determined by the following known tests:
   a. Incubation of AM protease with purified fibrinogen and the addition of thrombin to aliquots after intervals. The time required for the loss of clotting function is an index of fibrinogenolytic activity.
   b. Incubation of pre-formed fibrin clots with AM protease, and the measurement of the rate of clot disappearance. This measurement may be facilitated by preparing clots from $I^{125}$-labelled fibrinogen and measuring the release of radio-activity. This gives an index of fibrinolytic activity.
   c. Mixing AM protease, thrombin and fibrinogen together and observing the life of the clot formed. This gives a measure of the fibrinogenolytic and fibrinolytic activity of AM protease.

In vivo activity of AM protease in laboratory animals (rabbits) is determined by measuring the effect thereof on the fibrinogen levels in the animals and on the level of protease in the plasma. The former can be determined by measuring the prolongation of the whole blood or plasma clotting time, compared with the control or pre-treatment clotting time, on addition of a standard quantity of thrombin. The latter can be determined by a method similar to that listed in 1(b).

2. AM protease behaves as a single component on passage through a column of cross-linked dextran gel ('Sephadex' G 150; 'Sephadex' is a Trade Mark) which is permeable to proteins of a molecular weight of up to 400,000. The volume of buffer (eluant) in which AM protease emerges from the column corresponds to that required to elute a protein with a molecular weight of about 30,000. The said eluant is 0.3M NaCl 0.05M pH 7.4 tris/HCl buffer, which has the following composition (and the elution is carried out at about 2°C.):

| | |
|---|---|
| Sodium chloride | 17.5g./l. in water |
| Tris (hydroxymethyl)aminomethane | 6.05g./l. in water |
| Sufficient M hydrochloric acid to give pH 7.4 | |

3. AM protease behaves as a single component on sedimentation at $26 \times 10^4 \times g$ in the cell of an analytical ultracentrifuge. The sedimentation coefficient of AM protease in the 0.3M NaCl 0.05M pH 7.4 tris/HCl buffer [see (2) above] at 20°C., i.e. the $S_{20}W$, is about $2.35 \times 10^{-13}$ sec.

4. Only one component is evident upon electrophoresis of AM protease in polyacrylamide gel, and this component has a migration corresponding to a $\gamma$-globulin. The polyacrylamide gel had an acrylamide to bisacrylamide ratio of 150:1, the electrophoresis was run for 1 hour at 2 mA./sq. cm., and the buffer used [pH 4.3, $\beta$-alanine-acetic acid (0.3M)] consisted of $\beta$-alanine (26.73 g./l. in water) which was adjusted to pH 4.3 by the addition of glacial acetic acid.

5. The N terminal amino acid of AM protease is isoleucine.

6. AM protease readily degrades casein at pH 7 producing fragments soluble in trichloro-acetic acid; the degree of digestion is much less than that produced by trypsin, chymotrypsin or plasmin. It causes little degradation of serum albumin or $\gamma$globulin, even on prolonged incubation. It causes extensive degradation of fibrinogen. It has no action on small molecular weight substrates (e.g. $\alpha$-N-acetylglycyl-L-lysine methyl ester, $\alpha$-N-acetyl-L-lysine methyl ester, $\alpha$-N-p-toluenesulphonyl-L-arginine methyl ester, $\alpha$-N-acetyl-L-tyrosine ethyl ester or L-tryptophan ethyl ester) which are commonly used to characterize trypsin-like or chymotrypsin-like enzymes. It acts upon the $\beta$-chain of oxidized insulin causing the following amino end groups to appear:

tyrosine, lysine and, to a limited extent, leucine; in this respect also (see above) it differs from trypsin and chymotrypsin.

When obtained by the isolation procedure described below, AM protease appears to be essentially homogeneous by the usual biophysical criteria; i.e. sedimentation properties, electrophoretic properties, and behavior on gel filtration and ion exchange columns. In all cases homogeneity is indicated by the appearance of a narrow zone of protein having a symmetrical, almost Gaussian, distribution about a peak. Nevertheless, it is possible that AM protease is a mixture of closely-related isofunctional enzymes.

According to a further feature of the invention there is provided a process for the manufacture of AM protease, which comprises the following sequence of steps:

i. grinding or otherwise converting mature fruiting bodies of Armillaria mellea to a small size, and extracting this material with water so as to obtain an aqueous extract;

ii. precipitating unwanted contaminating proteins from the said aqueous extract by means of at least one water-miscible organic solvent at an appropriate temperature, pH and ionic strength, and removing the precipitated proteins by conventional means;

iii. precipitating crude AM protease from the solution thereof by adding at least one water-miscible organic solvent to the said solution [i.e. the solution remaining after the removal of the unwanted proteins in (ii)];

iv. partially purifying the crude AM protease by chromatography; and v. purifying the resulting impure AM protease by means of a molecular sieve technique.

It is to be understood that unless otherwise indicated, all of the above steps are carried out at a temperature of about 2°C. The above sequence of steps will now be considered in detail.

i. As indicated above, the fruiting bodies of Armillaria mellea are generally at the correct stage of maturity during late summer and autumn. In the United Kingdom they are mature from August to November. At that stage the fruiting bodies are yellow to deep brown, and they are rather flat or slightly depressed. As stated above, the fruiting bodies obtainable from the publicly-available specimens ACC 3659 (FPRL 6H) and ACC 3253 ("Armillaria mellea" from Centraabureau voor Schimmelcultures, Baarn, Netherlands) are sources of AM protease.

The mature fruiting bodies may be homogenized with water in a mechanical blender at 2°C. to 4°C. The resulting mixture is then separated by filtration or centrifugation, and both phases (i.e. solid phase and aqueous phase) are retained. The majority of AM protease transfers to the aqueous phase at this stage. Optionally, the solid phase may be either (a) freeze-dried, ground with solid carbon dioxide and then extracted with water at 2°C. to 4°C., or (b) the solid phase may be ground together with a suitable abrasive material, (e.g. sand, and water at 2°C. to 4°C. and the resulting mixture separated by filtration or centrifugation. In either case, some AM protease is generally obtained in the second aqueous extract. The aqueous extract, or the combined aqueous extracts, as the case may be, is or are then freeze-dried for storage or it or they can be used directly in stage (ii). A certain amount of darkening of the aqueous extract may occur. This is probably due to the action of a polyphenol oxidase. This darkening can be inhibited by working under nitrogen wherever practicable and by including in the extraction water at least one tyrosinase inhibitor, for example $10^{-3}$ to $10^{-4}$ M sodium benzoate or $10^{-3}$ to $10^{-4}$ M sodium ascorbate.

ii. Water-miscible organic solvents which can be used for precipitating the unwanted proteins are, for example, alkanols of up to three carbon atoms or alkanones of up to four carbon atoms, for example ethanol, n-propanol, isopropanol or acetone, or mixtures of any of these. These organic solvents may optionally be used together with a dialkyl ether of up to five carbon atoms, for example diethyl ether. The precipitation is generally carried out at −10°C. to 10°C., and more particularly at −2°C. to 2°C., and at a pH of 5 to 7, depending on the solvent used. An excess of the solvent should not be used, as this will cause the AM protease itself to be precipitated, as well as the unwanted proteins. The precipitated unwanted proteins are removed by any conventional method, for example by filtration or centrifugation.

iii. Suitable organic solvents for precipitating the crude AM protease are those mentioned under (ii). Similar conditions of temperature and pH are used to those given under (ii). The crude AM protease which is precipitated is collected by any conventional method, for example filtration or centrifugation, whereafter it is optionally but preferably washed with a suitable solvent, for example ice-cold 70 percent v/v aqueous ethanol. The crude AM protease may optionally then be (a) dissolved in ice-cold distilled water and freeze-dried, or (b) successively washed at −2°C. to 2°C. with dry ethanol and diethyl ether and then dried in vacuo at −2°C. to 2°C.

iv. The crude AM protease so obtained still contains relatively large amounts of unwanted proteins, and some of these can be removed by exploiting the different affinities of AM protease and the unwanted proteins for certain cation-exchange chromatographic materials, for example materials containing carboxymethyl radicals attached to a polysaccharide matrix, for example carboxymethylcellulose. The column is eluted with an aqueous buffer of pH 5 to 7, for example pH 6, and at a temperature of about 2°C. Generally speaking, the impure AM protease so obtained (still containing some unwanted proteins) is eluted after the principal peak of unwanted proteins. The eluted fractions containing impure AM protease may be concentrated by, for example, pressure dialysis.

v. The remaining unwanted proteinaceous contaminants are removed from the impure AM protease by means of a molecular sieve technique at about 2°C. using a column or membrane of a cross-linked hydrophilic polymer having molecular sieve characteristics in respect of a molecular weight of about 30,000. Suitable polymeric materials are, for example, cross-linked dextrans, for example 'Sephadex' (Trade Mark) G75, polyacrylamide gels, for example 'Bio-gel' (Trade Mark), and agaroses, for example 'Sagarose' (Trade Mark) or 'Sepharose' (Trade Mark). The impure AM protease from step (iv) is dissolved in a small volume of a buffer of pH 6 to 8, for example pH 7, for example a pH 7 0.3M sodium chloride-phosphate buffer, at about 2°C., and the solution is applied to the column or membrane at about 2°C. The column is then eluted with the same or a like buffer at about 2°C., whereupon AM protease is eluted before the contaminating proteins. The eluate containing AM protease may be concentrated by pressure dialysis. In the case of a membrane the contaminating proteins, solvent and electrolyte pass through the membrane whereas the AM protease does not; it is preferable to prevent the AM protease from drying out completely, otherwise it is difficult to remove from the membrane. The solution of AM protease on the application side of the membrane may be concentrated by pressure dialysis.

According to a further feature of the invention there is provided a process for the manufacture of AM protease which comprises the following sequence of steps:

i. homogenizing mature fruiting bodies of *Armillaria mellea* with water in a mechanical blender at 2°C. to 4°C., separating the resulting mixture by filtration or centrifugation so as to obtain a solid phase and an aqueous phase (A); an optionally either (a) freeze-drying the said solid phase, grinding the freeze-dried material with solid carbon dioxide, and extracting the resulting material with water at 2°C. to 4°C., so as to obtain an aqueous phase (B); or (b) grinding the said solid phase with sand, or a like abrasive material, and water at 2°C. to 4°C., and separating the resulting mixture by filtration or centrifugation, so as to obtain an aqueous phase (C); and optionally wherever practicable the operations under (i) being carried out under nitrogen and the extraction water containing at least one tyrosinase inhibitor, for example $10^{-3}$ to $10^{-4}$ M sodium benzoate or $10^{-3}$ to $10^{-4}$ M sodium ascorbate;

ii. precipitating unwanted contaminating proteins from the said aqueous phase (A), (B) or (C) by adding thereto at least one organic solvent selected from alkanols of up to three carbon atoms and alkanones of up to four carbon atoms, and mixtures thereof, optionally together with a dialkyl ether of up to five carbon atoms, at −2°C. to 2°C. and at a pH of 5 to 7; and then removing the precipitated unwanted proteins by filtration or centrifugation; so as to obtain a solution comprising AM protease;

iii. precipitating crude AM protease by adding to the said solution comprising AM protease at least one organic solvent selected from alkanols of up to three carbon atoms and alkanones of up to four carbon atoms, and mixtures thereof, optionally together with a dialkyl ether of up to five carbon atoms, at −2°C. to 2°C. and at a pH of 5 to 7; and collecting the precipitated crude AM protease by filtration or centrifugation; and optionally but preferably washing the said crude AM protease with ice-cold 70 percent v/v aqueous ethanol; and then optionally either (a) dissolving the crude AM protease in ice-cold distilled water and freeze-drying the solution, or (b) washing the crude AM protease at −2°C. to 2°C. successively with dry ethanol and diethyl ether and drying the product in vacuo at −2°C. to 2°C.;

iv. partially purifying the crude AM protease by chromatography thereof on a cation-exchange chromatographic material which contains carboxymethyl radicals attached to a polysaccharide matrix, for example carboxymethyl-cellulose; the said material being eluted with an aqueous buffer of pH 5 to 7, for example pH 6, at about 2°C.; and concentrating the eluted fractions containing AM protease by pressure dialysis; and v. purifying the impure AM protease so produced by dissolving it in a small volume of a buffer of pH 6 to 8, for example pH 7, at about 2°C., and applying the resulting solution at about 2°C. to a column or membrane of a cross-linked hydrophilic polymer having molecular sieve characteristics in respect of a molecular weight of about 30,000; and then either eluting the column with the same or a like buffer at about 2°C., and concentrating the eluate containing AM protease by pressure dialysis, or, in the case of the said membrane, causing the contaminating proteins and most of the solvent and electrolyte to pass through the membrane, and recovering the resulting solution of AM protease from the application side of the membrane and optionally concentrating this solution by pressure dialysis.

According to a further feature of the invention there is provided a process for the manufacture of AM protease which comprises growing mycelium of *Armillaria mellea* on a nutrient medium at about 25°C. and then isolating AM protease from the resulting mycelium by a process as described above except that the said mature fruiting bodies are replaced by the said resulting mycelium.

The mycelium may be grown by surface culture at about 25°C. on a nutrient medium comprising maize and wort. As suitable samples of *Armillaria mellea* there may be mentioned, for example, the said samples having our reference ACC 3253 and 3659.

AM protease is preferably stored in aqueous solution at about −25°C.

According to a further feature of the invention there are provided pharmaceutical compositions comprising AM protease and an inert, non-toxic, pharmaceutically-acceptable diluent or carrier.

The said pharmaceutical compositions may be in a form suitable for systemic intravenous or intra-arterial infusion or local intravenous or intra-arterial injection. Suitable compositions are sterile injectable aqueous solutions containing 0.05mg. to 1.0mg. of AM protease per ml., for example 0.25mg. of AM protease per ml. The pharmaceutical compositions of the invention contain conventional diluents or carriers and they are made by conventional methods. They may optionally contain a stabilizing agent, for example human plasma albumin, and they may also optionally contain a known analgesic agent.

The pharmaceutical compositions of the invention may be used for:

1. the treatment of arterial thrombosis;
2. the treatment of arterial emboli, for example emboli in the renal or mesenteric arteries, and particularly the leg arteries, and in the aorta at its bifurcation;
3. the treatment of deep vein thrombosis; and
4. the treatment of pulmonary embolism.

It is convenient to discuss the mode of use of AM protease in terms of (a) systemic therapy, and (b) local intravascular perfusion.

a. Systemic Therapy With AM Protease

The resistance of human plasma to AM protease varies between individuals as it does between animals of different species. This resistance also varies in individual human patients during systemic treatment with AM protease. A loading dose is required to overcome most of the circulating inhibitor. This dose is determined in the main by prior titration of the patient's plasma in vitro and also by titration in vivo by observing the response of increasing fractions of the predicted dose of AM protease as it is infused intravenously. The response which is measured is the prolongation of the clotting time which is produced by AM protease which is in excess of that affected by the inhibitor. In most cases the loading dose will be 0.05 to 5mg./kg./hour of AM protease.

When optimum plasma activity of AM protease has been produced, this has to be maintained by intermittent intravenous dosing of AM protease. This is necessary because it appears that there is a return of inhibitor into the circulation which causes the clotting times to return towards normal values, indicating loss of enzymic activity. We have observed that thrombolytic activity is maintained by administering approximately 10 percent of the initial dose of AM protease hourly for the next 2 hours, and then decreasing to less than 1 percent of the initial dose of AM protease every 2 to 3 hours. The reduction in the rate of dosing required to maintain activity is probably due to a fall-off in the rate of return of inhibitor into the circulation.

The duration of treatment with AM protease depends upon the age of the thrombus or thrombi, and their size. Systemic treatment is continued until there is evidence of clinical improvement, i.e. return of pulsation and improvement in the color of the limb in which the circulation has been affected by an arterial thrombosis.

b. Local Intravascular Perfusion of AM Protease

Local perfusion of AM protease would be useful in cases where there is a thrombotic occlusion of a large peripheral vein, or in thrombosed vessels used in the Scribner shunt for renal dialysis, or in a suitable segment of an artery which has been blocked by a thrombus. Such a procedure of local perfusion has the advantage that the dose used would be considerably less than that used for systemic therapy, i.e. one-eightieth to one one-hundredth of the systemic dose. Also there is no need to assess the level of inhibitor in the patient's blood. A standard dose can therefore be given, for example 5 to 10ml. (containing one-eightieth to one one-hundredth of the systemic dose) can be injected into a catheter in the part of the vein distal to the occlusion. This can be left for 10 minutes before aspirating the contents of the catheter. This procedure is repeated two or three times, and in most cases the thrombus will then be lyzed. The same procedure can be used for an accessible artery which is totally occluded by a thrombus, except that the catheter is inserted proximal to the occluded segment.

AM protease as obtained from *Armillaria mellea* contains a metal. We have found that the presence of a metal, but not necessarily the metal present in the said substance as obtained from *Armillaria mellea*, is essential for enzymic activity. The apo enzyme can be obtained by treating the holo enzyme, i.e. AM protease, with $10^{-3}$ M ethylenediamine tetra-acetic acid (pH 7) for 30 minutes at 4°C. Excess ethylenediamine tetra-acetic acid is removed by dialysis against 0.05 M pH 7.4 209 buffer, which has the following composition: i.e.

Tris(hydroxymethyl)aminomethane     6.05g./l. in water
Sufficient M hydrochloric acid to give pH 7.4

Enzymic activity can be restored by treatment of the apo enzyme in an aqueous medium with $Co_{++}$, $Zn_{++}$, $Ni_{++}$, $Fe_{++}$ and (in this case the enzyme activity is restored to a lesser extent) $Cu_{++}$; the products obtained by the said treatment will be referred to hereinafter as "modified AM protease."

According to a further feature of the invention there are provided pharmaceutical compositions comprising modified AM protease and an inert, non-toxic, pharmaceutically-acceptable diluent or carrier.

Suitable compositions and modes of administration are those compositions and modes of administration described above in the context of AM protease itself.

The invention is illustrated by the following examples:

EXAMPLE 1

Stage (i)

100g. of mature fruiting bodies of *Armillaria mellea* were homogenized in a M.S.E. 'Atomix' ('Atomix' is a Trade Mark) blender at 2°C. with 150ml. of water. The homogenate was mixed with another 150ml. of water, the mixture was stirred at 2°C. for 30 minutes, and then centrifuged. The centrifugate (liquid phase) was kept at 2°C. until further processing was effected (see below). The solid residue was freeze-dried, the product was ground to a fine powder together with solid carbon dioxide, the mixture was extracted with 150ml. of water at 2°C., and the extract was centrifuged. The centrifugate (liquid phase) was combined with the above-mentioned centrifugate. (Comments on this stage: The aqueous extract could be used directly in the next stage, or it could be freeze-dried for storage. Most of the AM protease, about 75 percent, is extracted on the homogenization with water).

Stage (ii)

The aqueous solution was adjusted to pH 6.0 with M acetic acid, and the solution was cooled to 2°C. in a refrigerated bath. 450ml. of ethanol at 2°C. were slowly added to the aqueous solution. The mixture was well stirred during this addition but care was taken to avoid frothing. The temperature was kept at 2°C. When the addition was complete the mixture was kept at 2°C. for 1 hour, and the precipitate which formed was removed by centrifugation (2,000 × g) for 30 minutes at 2°C. The solid residue was discarded and the centrifugate was used in stage (iii).

Stage (iii)

The centrifugate from stage (ii) was placed in the refrigerated bath and 450ml. of ethanol were slowly added. The temperature was allowed to fall to −5°C. during this addition. As in stage (ii), the mixture was well stirred but frothing was avoided. When the addition was complete the mixture was stirred for 1 hour at −5°C. It was then centrifuged and the centrifugate was discarded. The solid residue was suspended in 75ml. of 70 percent v/v ethanol-water at −5°C., and the suspension was centrifuged. The solid residue was dissolved at 2°C. in 30ml. of water, the solution was shell frozen at −70°C. and then freeze-dried. (Comments on this stage: About 90–95 percent of the starting activity is recovered in this step, and the freeze-dried material constitutes some 5 percent by weight of the solid starting material in this step, i.e. obtained from the aqueous extract).

Stage (iv)

100g. of 'Whatman' microgranular carboxymethyl-cellulose (CM 52; 'Whatman' is a Trade Mark) were washed with a pH 6.0 0.025M sodium citrate buffer until the washings had pH 6.0. The buffer was prepared by adjusting a solution of 7.35g./l. of trisodium citrate dihydrate in water to pH 6.0 by the addition of 2M hydrochloric acid. The equilibrated carboxymethylcellulose was then packed into a 2.5 × 30cm. column. 2ml. of a solution of 200mg. of the freeze-dried product of stage (iii) in the abovementioned citrate buffer were applied to the column at 2°C. The column was eluted at 2°C. with the citrate buffer at about 20ml./hr. and 5ml. fractions were collected. The eluate was monitored for light absorbance at 280m$\mu$; this gave an indication of the position of all protein peaks (proteins exhibit a peak of absorbance at 280m$\mu$). The enzymic activity, i.e. proteolytic activity, was monitored by the method outlined above under (1)(c). A large peak of ultraviolet-absorbing material exhibiting no proteolytic activity preceded the proteolytically-active fractions (i.e. containing AM protease), and the latter fractions were followed by further ultraviolet-absorbing non-proteolytic material. The pooled fractions were concentrated by pressure dialysis at 2°C. using 'Amicon' UM10 membranes ('Amicon' is a Trade Mark). (Comments on this stage: Depending upon the quality of the carboxymethylcellulose, which varies somewhat, the protein-aceous material including AM protease can be isolated as a discrete peak with about 20-fold purification or, under less favorable conditions, a five- to 10-fold purification. Up to 90 percent of the AM protease applied to the column is recovered. It may be necessary to alter the salt concentration of the eluant to compensate for the variable properties of different batches of carboxymethyl-cellulose).

Stage (v)

10g. of 'Sephadex' G75 ('Sephadex' is a Trade Mark) in bead form were allowed to swell for 24 hours in an excess of 0.15M sodium chloride 0.05M sodium phosphate buffer of pH 7.0. This buffer had the following composition:

| | |
|---|---|
| Sodium chloride | 8.53 g./l. in water |
| Sodium dihydrogen phosphate dihydrate | 7.8 g./l. in water |
| Solution adjusted to pH 7.0 with 2M sodium hydroxide solution | |

The swollen material was packed into a 1.5 × 20cm. column, and the column was washed with about 100ml. of the phosphate buffer at 2°C. for 2 hours. 2ml. of a concentrated sample of the eluate from stage (iv) were applied to the column. The column was eluted at 2°C. with the above phosphate buffer at about 20ml./hr., and 2ml. fractions were collected. The proteolytic activity of the fractions was monitored as outlined above in stage (iv), and the activity was found in the first peak of protein eluted. This was followed by another peak of protein which was not proteolytic. The active fractions were combined, dialyzed against water at 2°C. and freeze-dried. The freeze-dried product so obtained was AM protease. (Comments on this stage: The purification achieved varies between two- and five-fold; in general it is lower when stage (iv) is most efficient).

The overall purification achieved in all five stages was 300–500 fold, and about 70 percent of the original proteolytic activity was recovered.

EXAMPLE 2

A mycelial inoculum of *Armillaria mellea* ACC 3253 was made as follows:

2 percent malt agar (45ml.) in a medical flat bottle (200ml.) was inoculated by means of a sterile loop from a master culture of *Armillaria mellea* (kept on malt agar in a test tube). The bottle and its contents were incubated at 25°C. for 14 days. Sterile distilled water (30ml.) was added to the bottle and the aerial mycelium was rubbed off with a sterile needle to produce a mycelial suspension.

Cooked flaked maize (200g.) was placed in glass jars (2 l.). Unhopped brewery wort (specific gravity 1.182) was added in sufficient volume to reach the level of the surface of the maize. The mouth of each jar was covered with aluminum foil, and then the jars and their contents were autoclaved at 120°C. and a pressure of 15lb per sq. inch. After cooling, more wort was added to bring the wort level with the top of the maize. The jars and contents were autoclaved at 120°C. for 20 minutes.

After cooling to room temperature, the maize wort medium was inoculated with the mycelial suspension of *Armillaria mellea* (5ml.), and then incubated in the dark at 25°C. for 12 weeks, and then in the light for 4 weeks. The surface layer of mycelium which had formed was scraped off and ground with solid carbon dioxide to give a powder. Phosphate buffer of pH 7.4 (2ml.) was added. The buffer consisted of 0.1M sodium dihydrogen phosphate solution and 0.15M sodium chloride solution, adjusted to pH 7.4 by the addition of 2M sodium hydroxide solution. The mixture was centrifuged and the supernatant liquid was retained. There was thus obtained an aqueous solution containing AM protease. 100$\mu$l. of the said aqueous solution containing AM protease were added to 0.5ml. of a solution of human fibrinogen (95 percent clottable protein; 3mg./ml. in phosphate saline buffer; 0.1M phosphate pH 7.4), followed by 10$\mu$l. of a solution of bovine thrombin (500 N.I.H.* units/ml.) in the same buffer. The clot which formed lysed in about 90 seconds. This result demonstrated that the said aqueous solution contained a fibrinolytic enzyme. *The National INstitutes of Health, Bethesda, Maryland, U.S.A.

What we claim is:

1. AM protease obtained from Armillaria mellea which is characterized by the following properties:
   a. AM protease catalyzes the hydrolytic degradation of fibrinogen and fibrin.
   b. AM protease behaves as a single component on passage through a column of cross-linked dextran gel which is permeable to proteins of a molecular weight of up to 400,000, and the volume of 0.3M NaCl 0.05M pH 7.4 tris/HCl buffer in which at 2°C. AM protease emerges from the column corresponds to that required to elute a protein with a molecular weight of about 30,000.
   c. AM protease behaves as a single component on sedimentation at 26 × 10$^4$ × g in an analytical ultracentrifuge.
   d. Upon electrophoresis of AM protease for 1 hour at 2 mA/sq. cm. in a polyacrylamide gel, having an acrylamide to bisacrylamide ratio of 150:1, and using a pH 4.3 0.3 M β-alanine acetic acid buffer, only one component is evident and this has a migration corresponding to a γ-globin.

e. The N terminal amino acid of AM protease is isoleucine.

f. AM protease readily degrades casein at pH 7 producing fragments soluble in trichloro-acetic acid; the degree of digestion is much less than that produced by trypsin, chymotrypsin or plasmin. AM protease causes little degradation of serum albumin or γ-globulin, even on prolonged incubation. AM protease causes extensive degradation of fibrinogen. AM protease has no action on the following small molecular weight substrates which are commonly used to characterize trypsin-like or chymotrypsin-like enzymes: α-N-acetylglycyl-L-lysine methyl ester, α-N-acetyl-L-lysine methyl ester, α-N-p-toluenesulphonyl-L-arginine methyl ester, α-N-acetyl-L-tyrosine ethyl ester and L-tryptophan ethyl ester. AM protease acts upon the β-chain of oxidized insulin causing the following amino end groups to appear: tyrosine, lysine and, to a limited extent, leucine.

2. A process for the manufacture of AM protease which comprises the following sequence of steps:

a. homogenizing mature fruiting bodies of *Armillaria mellea* with water in a mechanical blender at 2°C. to 4°C., separating the resulting mixture by filtration or centrifugation so as to obtain a solid phase and an aqueous phase (A); and optionally either (i) freeze-drying the said solid phase, grinding the freeze-dried material with solid carbon dioxide, and extracting the resulting material with water at 2°C. to 4°C., so as to obtain an aqueous phase (B), or (ii) grinding the said solid phase with sand, or a like abrasive material, and water at 2°C. to 4°C., and separating the resulting mixture by filtration or centrifugation, so as to obtain an aqueous phase (C); and optionally wherever practicable carrying out the operations under (a) in a nitrogen atmosphere and the extraction water containing at least one tyrosinase inhibitor;

b. precipitating unwanted contaminating proteins from the said aqueous phase (A), (B) or (C) by adding thereto at least one organic solvent selected from alkanols of up to three carbon atoms and alkanones of up to four carbon atoms and mixtures thereof, optionally together with a dialkyl ether of up to five carbon atoms, at −2°C. to 2°C. and at a pH of 5 to 7; and then removing the precipitated unwanted proteins by filtration or centrifugation; so as to obtain a solution comprising AM protease;

c. precipitating crude AM protease by adding to the said solution comprising AM protease at least one organic solvent selected from alkanols of up to three carbon atoms and alkanones of up to four carbon atoms and mixtures thereof, optionally together with a dialkyl ether of up to five carbon atoms, at −2°C. to 2°C. and at a pH of 5 to 7; and collecting the precipitated crude AM protease by filtration or centrifugation; and washing the said crude AM protease with ice-cold 70 percent v/v aqueous ethanol;

d. partially purifying the said crude AM protease by chromatography thereof on a cation-exchange chromatographic material containing carboxymethyl radicals attached to a polysaccharide matrix, the said material being eluted with an aqueous buffer of pH 5 to 7 at about 2°C; and concentrating the eluted fractions containing AM protease by pressure dialysis; and e. purifying the impure AM protease so produced by dissolving it in a small volume of a buffer of pH 6 to 8 at about 2°C., and applying the resulting solution at about 2°C. to a column or membrane of a cross-linked hydrophilic polymer having molecular sieve characteristics in respect of a molecular weight of about 30,000; and then either eluting the column with the same or a like buffer at about 2°C. and concentrating the eluate containing AM protease by pressure dialysis, or, in the case of the said membrane, causing the contaminating proteins and most of the solvent and electrolyte to pass through the membrane, and recovering the resulting solution of AM protease from the application side of the membrane.

3. A process for the manufacture of AM protease which comprises growing mycelium of *Armillaria mellea* on a nutrient medium at about 25°C. and then isolating AM protease from the resulting mycelium by a process as claimed in claim 3 wherein the said mature fruiting bodies are replaced by the said resulting mycelium.

4. In a process for the manufacture of AM protease, the step which consists in growing mycelium of *Armillaria mellea* on a nutrient medium comprising maize and wort at about 25°C.

* * * * *